United States Patent
Tueno et al.

(10) Patent No.: US 12,250,292 B2
(45) Date of Patent: Mar. 11, 2025

(54) PRIVATE SET INTERSECTION FROM BRANCHING PROGRAMS

(71) Applicant: SAP SE, Walldorf (DE)

(72) Inventors: Anselme Tueno, Ettlingen (DE); Jonas Janneck, Mannheim (DE)

(73) Assignee: SAP SE, Walldorf (DE)

( * ) Notice: Subject to any disclaimer, the term of this patent is extended or adjusted under 35 U.S.C. 154(b) by 251 days.

(21) Appl. No.: 17/752,326

(22) Filed: May 24, 2022

(65) Prior Publication Data

US 2023/0388102 A1 Nov. 30, 2023

(51) Int. Cl.
*H04L 9/00* (2022.01)
*G06F 7/523* (2006.01)
*G06F 21/60* (2013.01)
*H04L 9/32* (2006.01)

(52) U.S. Cl.
CPC ............. *H04L 9/008* (2013.01); *G06F 7/523* (2013.01); *G06F 21/602* (2013.01); *H04L 9/32* (2013.01); *H04L 2209/46* (2013.01)

(58) Field of Classification Search
CPC ....... H04L 9/008; H04L 9/32; H04L 2209/46; G06F 21/602
See application file for complete search history.

(56) References Cited

U.S. PATENT DOCUMENTS

| | | | | |
|---|---|---|---|---|
| 2016/0156595 | A1* | 6/2016 | Wu | H04L 9/008 713/168 |
| 2017/0063525 | A1* | 3/2017 | Bacon | H04L 9/008 |
| 2019/0190714 | A1* | 6/2019 | Joye | G06F 18/285 |
| 2021/0344478 | A1* | 11/2021 | Sarpatwar | G06N 3/08 |
| 2021/0376995 | A1* | 12/2021 | Ratha | H04L 9/3265 |
| 2023/0186106 | A1* | 6/2023 | Valdes | G06F 18/24323 706/46 |

OTHER PUBLICATIONS

Demertzis et al., Practical Private Range Search in Depth, Mar. 2018, ACM, vol. 43, No. 1 (Year: 2018).*

* cited by examiner

*Primary Examiner* — Ellen Tran
(74) *Attorney, Agent, or Firm* — SCHWEGMAN LUNDBERG & WOESSNER, P.A.

(57) ABSTRACT

In an example embodiment, a protocol for private set intersection is introduced that provides for two-party computation. Each party has a private data set and both parties want to securely compute the intersection of their sets, such that only the result is revealed and nothing else. Construction rules are provided that rely on the evaluation of a branching program (BP) using a fully homomorphic encryption (FHE) scheme. Using the properties of an FHE scheme, a non-interactive protocol is built with extendable functionalities. Thus, not only can the intersection be securely computed but the result can be used for further secure computations. Furthermore, the communication overhead for practical applications is independent of the server's set size, allowing for easy scalability.

20 Claims, 14 Drawing Sheets

US 12,250,292 B2

PRIVATE SET INTERSECTION FROM BRANCHING PROGRAMS

TECHNICAL FIELD

This document generally relates to systems and methods for cryptography. More specifically, this document relates to a private set intersection from branching programs.

BACKGROUND

In various types of computing environments, there are situations where multiple parties with private data wish to compute a common function on their respective private data, without revealing the private data. In some of these instances, one of the parties is operating a server and another of the parties is operating a client, where the server has a significantly larger private data set than the client, and the results of the computation (such as an intersection) should be revealed only to the client.

BRIEF DESCRIPTION OF DRAWINGS

The present disclosure is illustrated by way of example and not limitation in the figures of the accompanying drawings, in which like references indicate similar elements.

DETAILED DESCRIPTION

Figure 1:
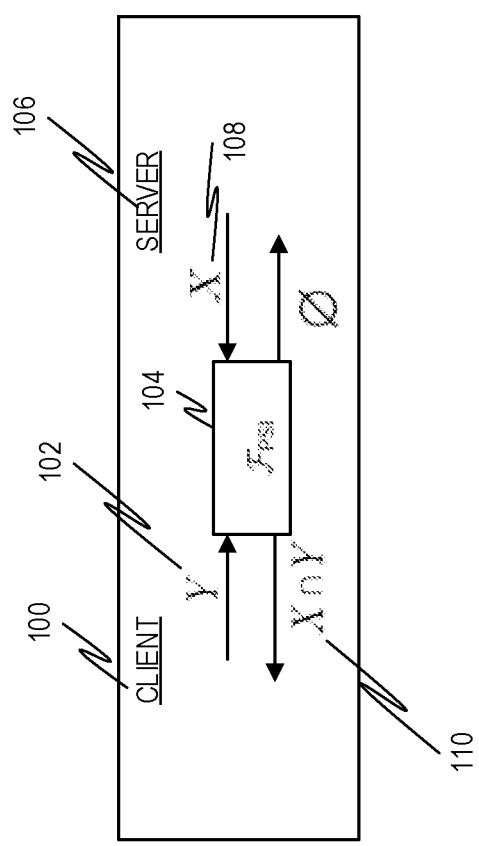
FIG. 1 is a block diagram illustrating a client-server architecture where the ideal functionality $\mathcal{F}_{PSI}$ is implemented, in accordance with an example embodiment.

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

Multiparty computation (MPC) is a cryptographic technique that allows several parties to compute a function on their private inputs without revealing any information other than the function's output. One example of MPC is Private Set intersection (PSI), which allows two parties to compute the intersection of their private sets without revealing anything except the intersection. A special case is the client-server setting, where the server has a significantly larger set than the client and the intersection should be revealed only to the client. Moreover, the server has larger computational power and its set may undergo frequent updates, while the client's computational and storage capacity is limited compared to the server.

In an example embodiment, a protocol for private set intersection is introduced that provides for two-party computation. Each party has a private data set and both want to securely compute the intersection of their sets, such that only the result is revealed and nothing else. Construction rules are provided that rely on the evaluation of a branching program (BP) using a fully homomorphic encryption (FHE) scheme. Using the properties of an FHE scheme, a non-interactive protocol is built with extendable functionalities. Thus, not only can the intersection be securely computed but the result can be used for further secure computations. Furthermore, the communication overhead for practical applications is independent of the server's set size, allowing for easy scalability.

In an example embodiment, the server's data set is represented as a branching program. The client generates a pair of public and private keys for a fully homomorphic encryption scheme and reveals the public key to the server. To compute the intersection, the client sends its encrypted input to the server using its public key. The server evaluates its branching program on the encrypted inputs and sends back an encrypted result that only the client can decrypt. For each client's input y, the client receives a ciphertext encrypting either 1 (if y is in the intersection) or 0 (otherwise).

One use case for this solution is where data is collected by different parties that do not trust each other but must collaborate to achieve a common goal. For example, the parties may want to compute meaningful statistic on the joint data. For privacy reasons, sharing the distributed data may not be allowed. Private set intersection is applicable to many such privacy-sensitive scenarios. One example is an antivirus company holding a large database of malware signature, which can use PSI to offer a malware detection service to end-users. The user can utilize this service to check a small set of applications without revealing anything about those applications and learning nothing about the database. Another example is messaging services, where the server has a large database of users. Each user using the service may want to check if anyone on its private contact list is using the same messaging service. Another example is a server storing a database of leaked private credentials (e.g., passwords), which can be offered as a service to users allowing them to check if their credentials are still safe to use. Another example is contact tracing applications for a pandemic such as COVID-19, where users' devices periodically generate random strings and exchange with other nearby devices. When a user tests positive, he uploads his own random strings for a given period to a remote server. Non-tested users can check their generated random string against the server to see if they need to be tested as well.

Another example is object-level tracking along supply chains, enabled by the low cost and wide availability of Radio Frequency Identification (RFID) technology, which permits companies to collect large amounts of data (e.g., time, location, handling) about the goods they produce. Combining the data collected by the different companies along a supply chain can provide considerable advantages to all of the companies. However, such a sharing sometimes needs to be selective. For example, a company A may want to share data about a set of objects with a company B if and only if B belongs to the supply chain of those objects.

For purposes of the present document, the server may also be referred to as the sender and the client as the receiver.

Homomorphic encryption (HE) allows computations on ciphertexts by generating an encrypted result whose decryption matches the result of a function on the plaintexts. An HE scheme consists of the following algorithms:

pk, sk, ek←KGen($\lambda$): This probabilistic algorithm takes a security parameter $\lambda$ and outputs public, private, and evaluation keys pk, sk, and ek.

c←Enc(pk, m): This algorithm takes pk and a message m and outputs a ciphertext c. One can use [m] as a shorthand notation for Enc(pk, m).

c←Eval(ek, $f$, $c_1$, ..., $c_n$): This algorithm takes ek, an n-ary function $f$ and n ciphertexts $c_1$, ..., $c_n$ and outputs a ciphertext c.

m'←Dec(sk, c): This deterministic algorithm takes sk and a ciphertext c and outputs a message m'.

Furthermore, indistinguishability under chosen plaintext attack (IND-CPA) security, and the following correctness conditions are required. Given any set of n plaintexts $m_1$, ..., $m_n$, any keys pk, sk, ek, the following are held:

Dec(sk, Enc(pk, $m_i$))=Dec(sk, $[m_i]$)=$m_i$.

Dec(sk, Eval(ek, $f$ $[m_1]$, ..., $[m_n]$))=Dec(sk, $[f(m_1, ..., m_n)]$).

In an example embodiment, a protocol called the PSI protocol is provided, which comprises a server (or sender) holding a set X of size $N_X$, and a client (or receiver) holding a set Y of size $N_Y$. It can be assumed that both sets comprise $\mu$-bit strings and $N_X$, $N_Y$ are public. The ideal functionality $\mathcal{F}_{PSI}$ takes X from the sender and Y from the receiver. It computes and outputs X∩Y to the receiver and nothing to the sender. FIG. 1 is a block diagram illustrating a client-server architecture where the ideal functionality $\mathcal{F}_{PSI}$ is implemented, in accordance with an example embodiment. Here, client 100 sends Y 102 to $\mathcal{F}_{PSI}$ 104, while server 106 sends X 108 to $\mathcal{F}_{PSI}$ 104.

A protocol correctly implements the PSI functionality if, after the computation, the output X∩Y 110 to the client 100 is correct. A protocol securely implements the PSI functionality $\mathcal{F}_{PSI}$ 104 if the client 100 learns only the result X∩Y 110 and nothing else, and the server learns nothing. In particular, there are simulators $Sim_C^{psi}$ and $Sim_S^{psi}$ that simulate the client 100 and the server 106 given only their input and output to the protocol.

In an example embodiment, the protocol provided relies on a branching program that is represented as a tree. Thus, the data structure utilized is a binary tree consisting of inner nodes and terminal nodes. Each inner node has two child nodes and terminal nodes have no child node. There is a node with no parent node that is called the root node. Let v be a node in the tree. A node data structure Node comprises the following attributes:

v.parent: a value representing the pointer to the parent node, v.left: a value representing the pointer to the left child node, v.right: a value representing the pointer to the right child node, v.lEdge: a bit representing the edge label to the left child node, v.rEdge: a bit representing the edge label to the right child node, v.cLabel: a value representing a node label, v.level: an integer representing the node level in the tree, v.cost: an integer representing the cost on the path from the root.

The pointer to the parent node v.parent is initially null and points to the respective parent node when the child node is created. This point remains null for the root node. The pointers to the child nodes v.left, v.right are initially null, and point to the respective nodes if they are created. The edge labels to the child nodes v.lEdge, v.rEdge are 0 on the left and 1 on the right. The node label v.cLabel is 0 or 1 for terminal nodes and undefined for inner nodes. The level v.level is 1 for the root node, 2 for the child nodes of the root, and so on. The cost attribute v.cost is computed during tree evaluation.

Figure 2:
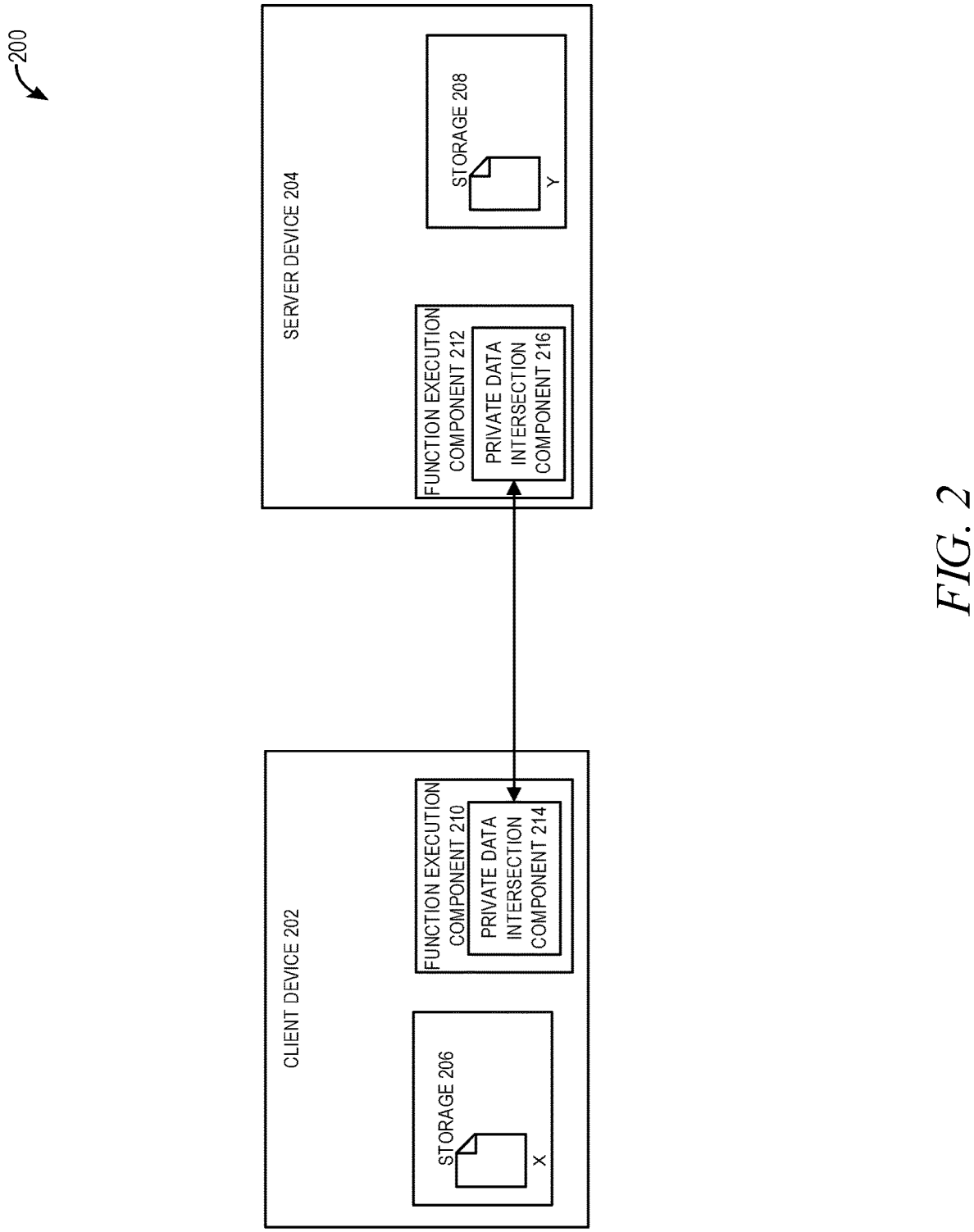
FIG. 2 is a block diagram illustrating a system for private data set intersection in accordance with an example embodiment.

FIG. 2 is a block diagram illustrating a system 200 for private data set intersection in accordance with an example embodiment. The system 200 includes a client device 202 and a server device 204. The client device 202 includes a storage 206, which contains private data. In this context, "private data" means data that the owner or operator of the client device 202 does not wish to share with the server device 204. Likewise, the server device 204 also includes a storage 208, which contains its own private data (i.e., data that the owner or operator of the server device 204 does not wish to share with the client device 202). Both the client device 202 and the server device 204 contain function execution components 210, 212, which allow each to perform various functions on the data in their respective storages 206, 208. Additionally, the function execution components 210, 212 each contain private data set intersection components 214, 216, which specifically provide functionality for performing private data set intersection between the client device 202 and the server device 204. It should be noted that while private data set intersection components 214 and 216 share the same name, the underlying functionality may differ from private data set intersection component 214 and private data set intersection component 216. Specifically, as will be described in more detail below, the processes performed by the client device 202 in order to accomplish the intersection function without sharing the underlying data are different than the processes performed by the server device 204 to accomplish that same goal.

Figure 3:
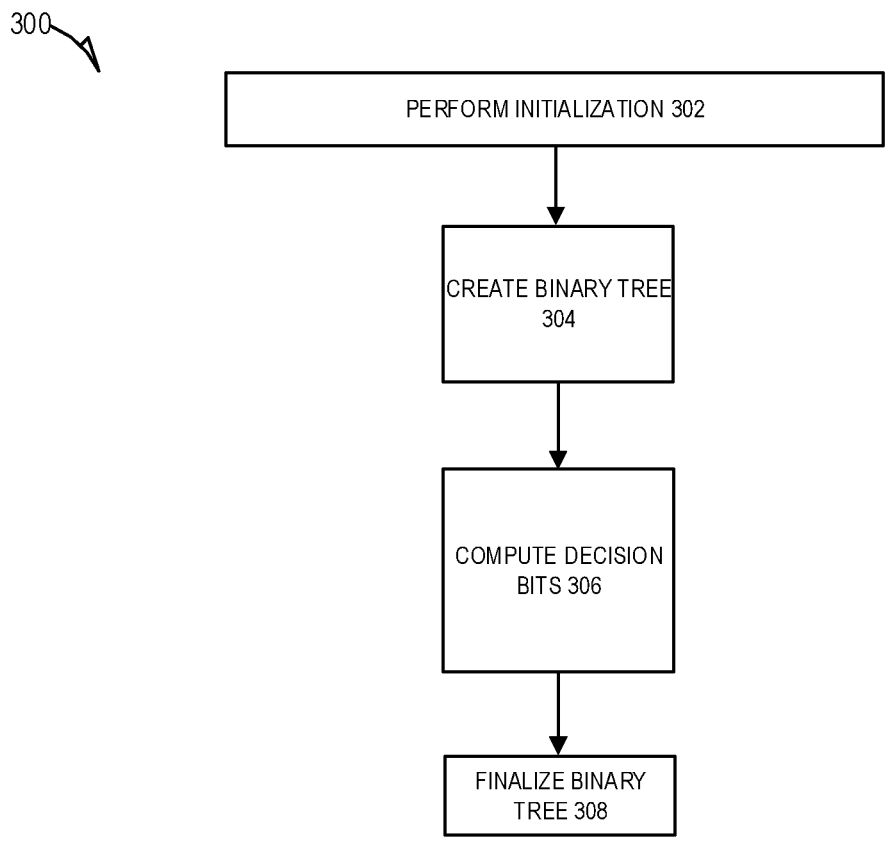
FIG. 3 is a flow diagram illustrating a method for private data set intersection in accordance with an example embodiment.

FIG. 3 is a flow diagram illustrating a method 300 for private data set intersection in accordance with an example embodiment. At operation 302, initialization is performed. The initialization comprises a one-time key generation. The client generates an appropriate triple (pk, sk, ek) of public, private and evaluation keys for a homomorphic encryption scheme. Then, the client sends (pk, ek) to the server. For each computation, the client just encrypts its input and sends it to the server. The actual computation on the binary tree is performed only by the server.

At operation 304, the binary tree is created. For this operation, let $X=\{x_1, \ldots, x_{N_X}\}$, where all inputs have bitlength $\mu$. The server starts by creating a binary tree representing X. The basic idea is of creating a binary tree representing all bit strings of length $\mu$. Then, each leaf that represents an input in X is labeled with 1 (i.e., v.cLabel=1), otherwise the leaf is labeled with 0 (i.e., v.cLabel=0). Finally, all subtrees labeled with the same bit can be pruned. That is, if an inner node v has two child nodes labeled with the same bit b, the child nodes of v are removed from the tree and v is transformed into a leaf node labeled with b, (i.e., v.cLabel=b). To avoid creating the full tree representing all strings of length $\mu$, instead the elements of X may be inserted one by one.

The process for creating the binary tree therefore comprises two parts. First, each input x is inserted by traversing the tree according to its bits. In an example embodiment, the following insertion procedure may be used:

```
1:     function INSERTNODE(root,x)
2:         let curr be an empty node
3:         let x[1], . . . , x[μ] be the bit string of x
4:         curr ← root
5:         for i = 1 to μ do
6:             if x[i] = 1 then
7:                 if curr.right = = null then
8:                     let vᵣ, vₗ be new nodes
9:                     curr.right ← vᵣ
10:                    vₗ.cLabel ← 0
11:                    curr.left ← vₗ
12:                curr ← curr.right
13:            else
14:                if curr.left = = null then
15:                    let vᵣ, vₗ be new modes
16:                    curr.left ← vₗ
17:                    vᵣ.cLabel ← 0
18:                    curr.right ← vᵣ
19:                curr ← curr.left
20:        curr.cLabel ← 1
21:        return root
```

While traversing the tree, the subtrees that x does not traverse are marked as leaf nodes labeled with 0.

The server repeats the insertion procedure for all elements of X.

Figure 4:
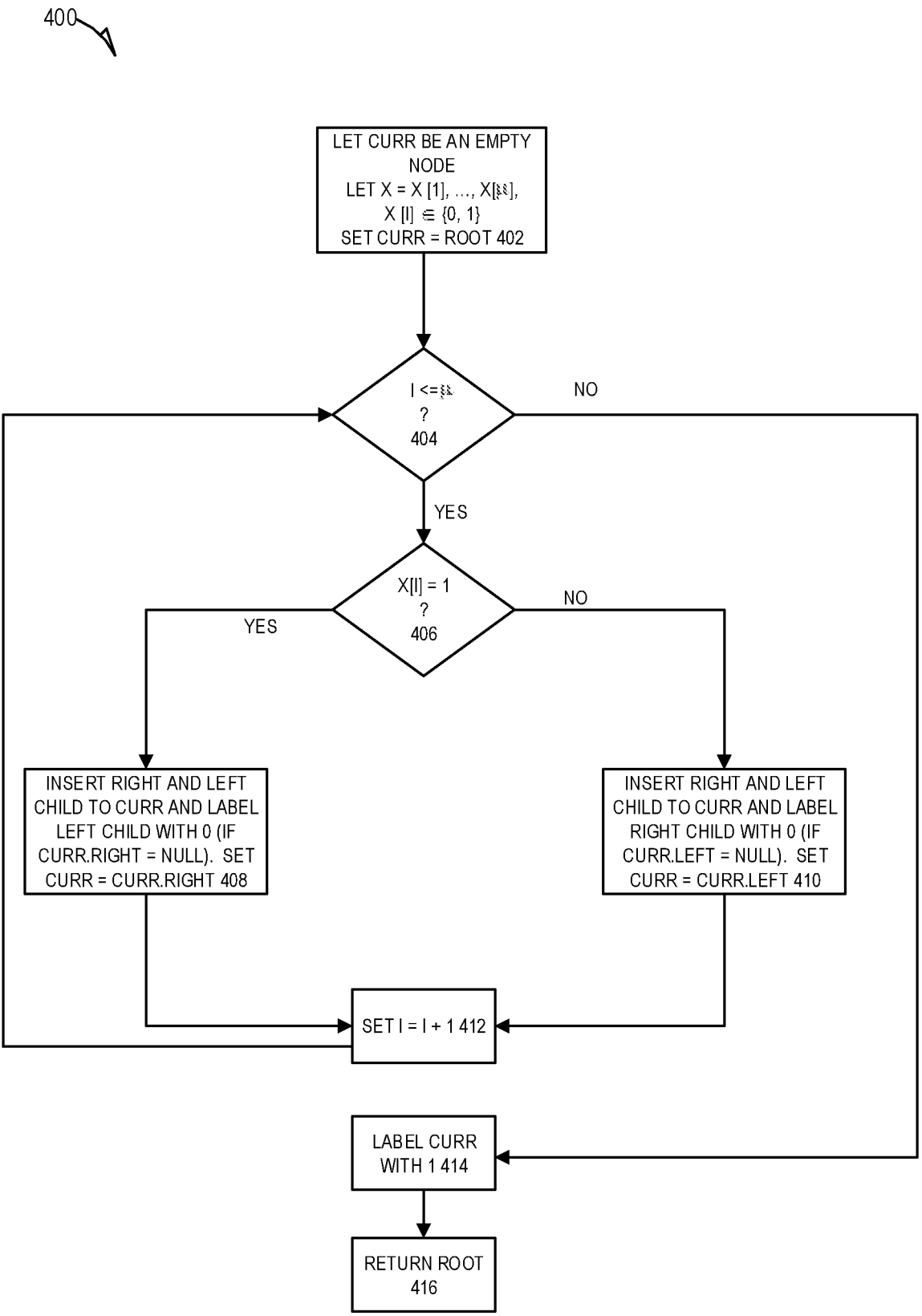
FIG. 4 is a flow diagram illustrating a method of inserting a node in a binary tree, in accordance with an example embodiment.

FIG. 4 is a flow diagram illustrating a method 400 of inserting a node in a binary tree, in accordance with an example embodiment. At operation 402, curr is assigned to be an empty node. At operation 404, it is determined if i<=μ. If so, then the method 400 has not yet reached the end of the bit string, and thus at operation 406 it is determined if x[i]=1. If so, then at operation 408 a right and left child are inserted to curr and the left child is set to 0, along with curr being set to curr.right. If not, then at operation 410 a right and left child are inserted to curr and the right child is set to 0, along with curr being set to curr.left. Then, at operation 412, i is set to i+1. Then the method 400 loops back to operation 404.

If at operation 404 it is determined that i>μ, then at operation 414, curr is labeled with 1 and at operation 416 the root is returned.

In the second part, the server collects the leaf nodes in a queue with variable name leaves using Steps 5 to 14 of the following procedure, in an example embodiment.

```
1:     function CREATETREE(X)
2:         let root be a new node
       ▶ Insert Nodes
3:         for each x ∈ X do
4:             INSERTNODE(root, x)
       ▶ Collect Leaves
5:         let leaves be an empty queue
6:         stack.push(root)
7:         while stack.empty( ) = false do
8:             v ← stack.pop( )
9:             if v.right ≠ null then
10:                stack.push(v.right)
11:            if v.left ≠ null then
12:                stack.push(v.left)
13:            if v.isLeaf( ) then
14:                leaves.enqueue(v)
       ▶ Prune Tree
15:        vₗ ← leaves.dequeue( )
16:        while leaves.empty( ) = false do
17:            vᵣ ←leaves.dequeue( )
18:            if vₗ.parent = vᵣ.parent and vₗ.cLabel = vᵣ.cLabel then
19:                vₗ.parent.left ← null
20:                vₗ.parent.right ← null
21:                vₗ.parent.cLabel + vₗ.cLabel
22:                leaves.enqueue(vₗ.parent)
23:                vₗ ← leaves.dequeue( )
24:            else
25:                vₗ ← vᵣ
26:        return root
```

The collection starts at the root node and traverses the tree in a depth-first search (DFS) until it reaches leaf nodes and adds them to the variable leaves. Then, the server prunes the resulting tree as explained above and illustrated in Steps 15 to 25 of the above procedure.

The pruning procedure takes the previously collected leaves as a parameter. It successively removes the first two elements of the queue leaves. If they have an identical parent and node label, then their parent is transformed to a leaf node with the same label and added at the end of the queue.

Note that at this stage the computation is done on the plaintext representation of X and is therefore very fast.

Figure 5:
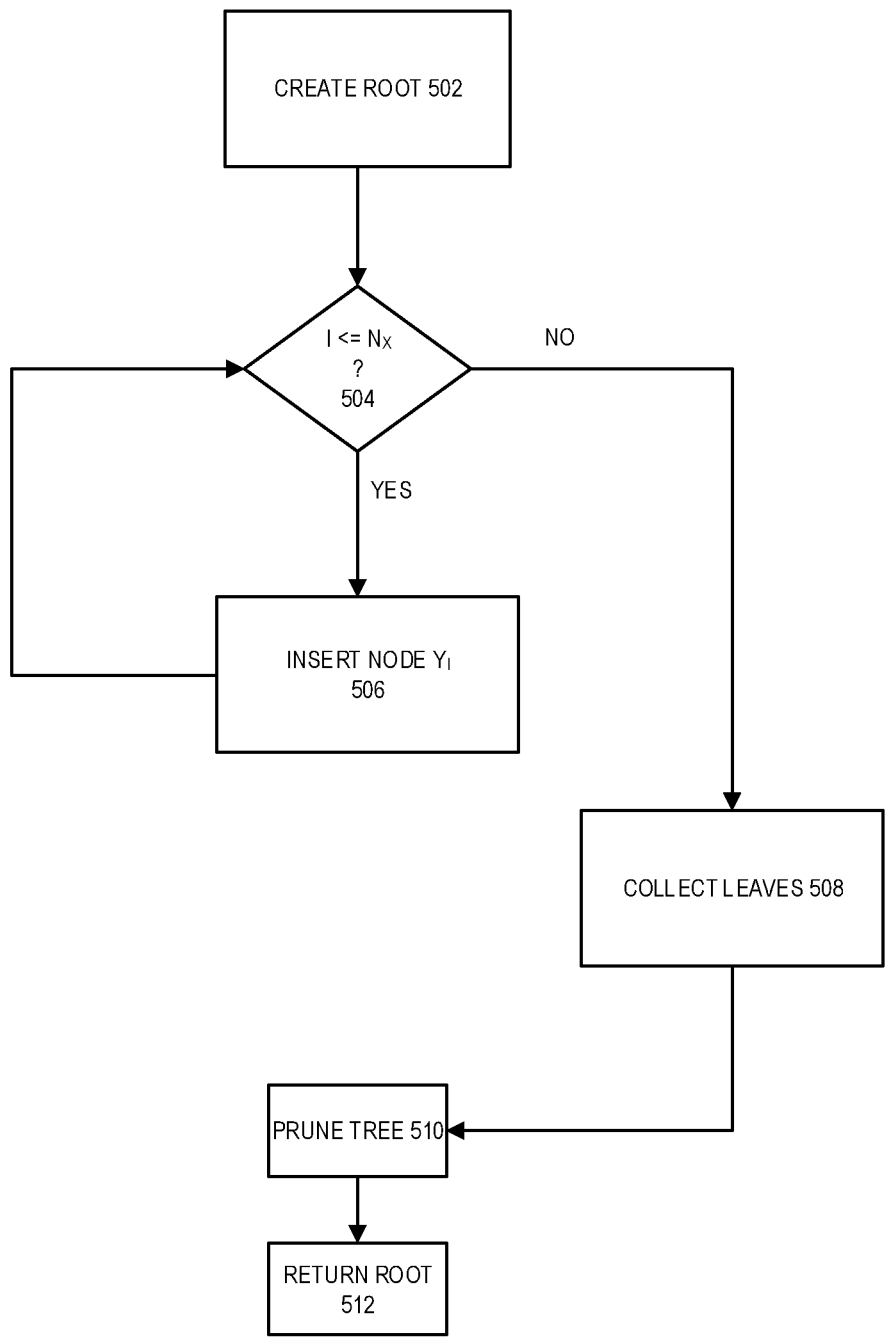
FIG. 5 is a flow diagram illustrating a method for creating a binary tree, in accordance with an example embodiment.

FIG. 5 is a flow diagram illustrating a method 500 for creating a binary tree, in accordance with an example embodiment. At operation 502, the root is created. At operation 504, it is determined if I<=to $N_X$. If so, then at operation 506 node $Y_i$ is inserted and the process loops to operation 504. If not, then at operation 508 the leaves are collected. At operation 510, the tree is pruned. At operation 512, the root of the created binary tree is returned.

Figure 6:
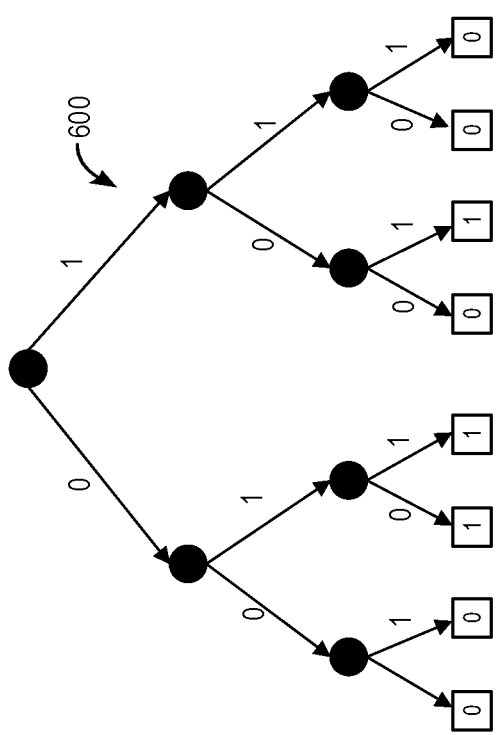
FIG. 6 is a diagram illustrating a binary tree in accordance with an example embodiment.
Figure 7:
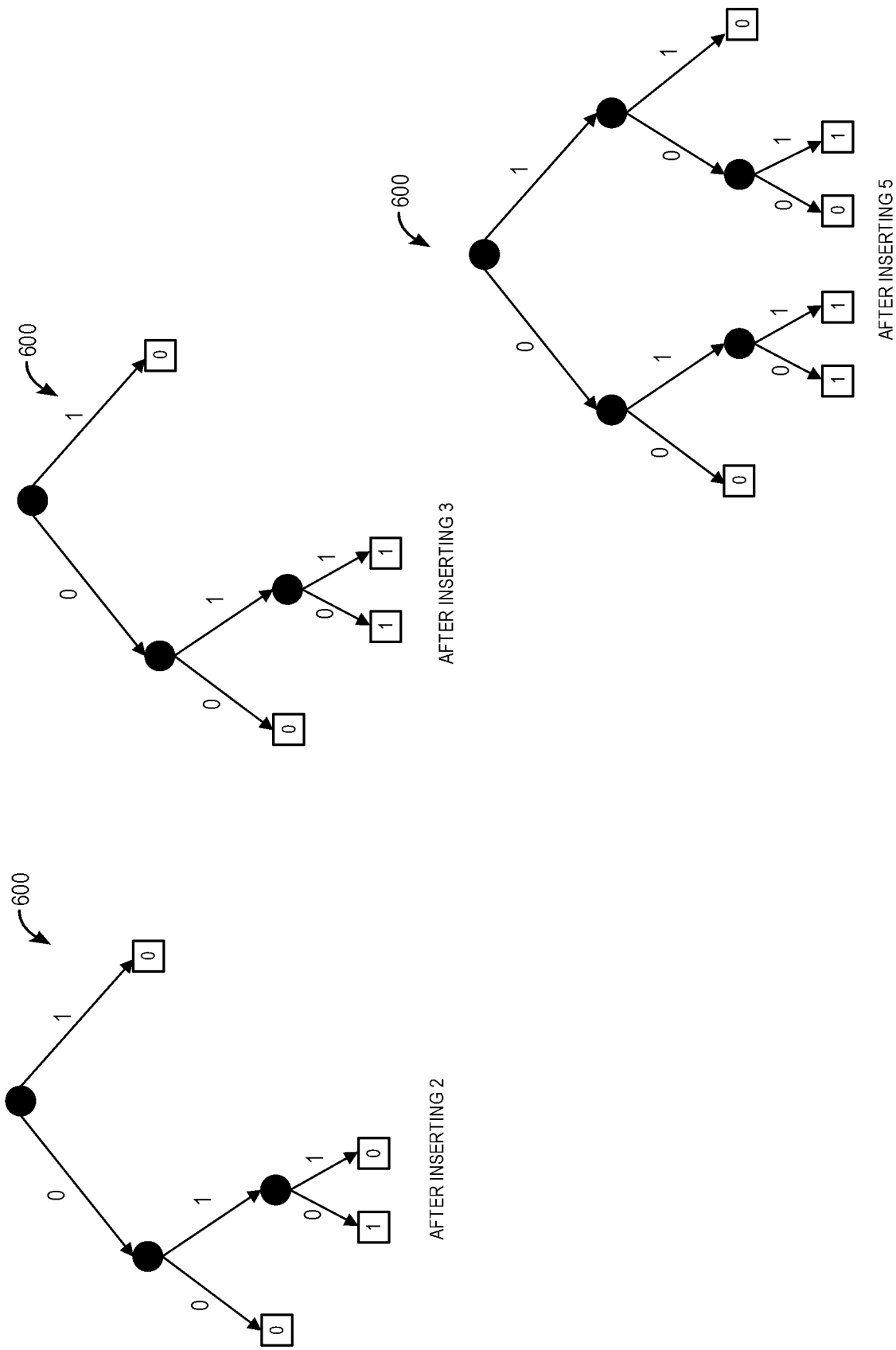
FIG. 7 is a diagram illustrating node insertion, in accordance with an example embodiment, showing a binary tree at various stages of insertion, in accordance with an example embodiment.
Figure 8:
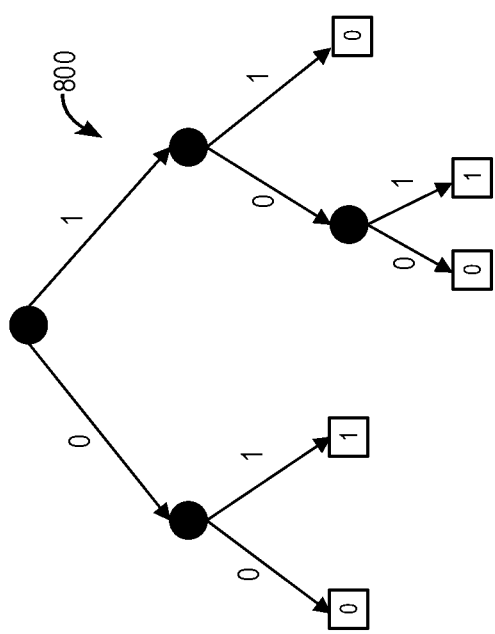
FIG. 8 illustrates a pruned tree, in accordance with an example embodiment.

FIG. 6 is a diagram illustrating a binary tree 600 in accordance with an example embodiment. As an example, assume that $\mu=3$ and $X=\{2, 3, 5\}$, then binary tree 600 represents the binary of X before pruning. FIG. 7 is a diagram illustrating node insertion, in accordance with an example embodiment, where showing binary tree 600 at various stages of insertion (here inserting 2, 3, and 5) prior to it appearing as it does in FIG. 6. FIG. 8 illustrates the pruned tree 800 after steps 15-25 of the above procedure.

Referring back to FIG. 3, at operation 306, decision bits are computed. In this operation, let $Y=\{y_1, \ldots, y_{N_X}\}$ be the set of the client. The client sends each input in Y bitwise encrypted. For each y∈Y, let $\bar{y}=y[1], \ldots, y[\mu]$ be the corresponding bit string and $[\bar{y}]=[y[1]], \ldots, [y[\mu]]$ the corresponding ciphertexts. The server computes the decision bits at each inner node v by comparing each [y[i]] against the edge labels of node v. This comparison is a bit equality test that returns [1] if the two bits are equal and [0] otherwise. It is therefore implemented using the Boolean XNOR gate.

As a shorthand notation, one can use ⊞.. Note that the XNOR gate on the left branch may be neglected since it is labeled with 0. The computation of decision bits is illustrated in the function below. The function uses a queue with enqueue and dequeue functions which add and remove elements. The complexity may be reduced by computing the decision bit only once per level and use the decision bit for any node at this level. This minimizes the number of evaluations to the depth of the tree.

```
 1:    function EVALNODES(root, [ȳ])
 2:       let Q be a new queue
 3:       Q.enqueue(root)
 4:       parse [ȳ] to [y[1]], . . . , [y[µ]]
 5:       while Q.empty( ) = false do
 6:          v ← Q.dequeue( )
 7:          if v.left ≠ null then
 8:             [v.left.cost] ← [y[v.level]]
 9:             Q.enqueue(v.left)
10:          if v.right ≠ null then
11:             [v.right.cost] ← [y[v.level]] ⊞ 1
12:             Q.enqueue( v.right)
```

It should be noted the above function is very efficient since there is exactly one homomorphic evaluation at each node. This operation can even be saved by computing it on plain-text at the client's side. Instead of sending [y[1]], . . . , [y[µ]], the client sends [y[1]]. [¬y[1]], . . . , [y[µ]]. [¬y[µ]]. This doubles the number of ciphertexts the client has to send for each input. The server can now evaluate each node without any homomorphic operation by labeling the left branch with [y[i]] as before and the right branch with [¬y[i]].

The aggregated result is stored at the leaf node of the corresponding path. In an example embodiment, this may be implemented as a queue, with the tree being traversed in breadth-first search order, as illustrated in the function below:

```
 1:    function EVALPATHS(root)
 2:       let Q be a queue
 3:       let leaves be a queue
 4:       Q.enqueue(root)
 5:       while Q.empty( ) = false do
 6:          v + Q.dequeue( )
 7:          if v.left ≠ then
 8:             [v.left.cost] ← [v.left.cost] ⊡ [v.cost],
 9:             if v.left.isLeaf( ) then
10:                leaves.enqueue(v.left)
11:             else
12:                Q.ebqyeye(v.left)
13:          if v.right ≠ null then
14:             [v.right.cost] ← [v.right.cost] ⊡ [v.cost],
15:             if v.right.isLeaf( ) then
16:                leaves.enqueue(v.right)
17:             else
18:                Q.enqueue(v.right)
19:       return leaves
```

Note that this computation can be improved using path prefixes: that is, for two paths having the same prefix, the prefix is evaluated once.

At operation 308, the binary tree may be finalized. Specifically, after aggregating the decision bits along the paths to the leaf nodes, each leaf node v stores either [v.cost]=[0] or [v.cost]=[1]. Moreover, there is a unique leaf with [v.cost]=[1] and all other leaves have [v.cost]=[0]. Then, the server aggregates the costs at the leaves by computing for each leaf v the value [v.cost] ⊡ [v.cLabel] and summing up the results of all leaves. This computation is illustrated in the function below.

```
1:    function EVALLEAVE(leaves)
2:       [b] ← [0]
3:       for each v ∈ leaves do
4:          [b] ← [b] ⊞ ([v.cost] ⊡ v.cLabel])
5:       return [b]
```

As described above, the whole computation is performed by the server. The server creates a tree representation of the input, and then for each y the client sends the encrypted bit representation and the server sequentially evaluates nodes, paths, and leaves. The server then sends the resulting ciphertext, encrypting either 1 or 0, to the client. The client decrypts and learns the result. If it is 1, then y is in the intersection, otherwise it is not in the intersection.

Figure 9:
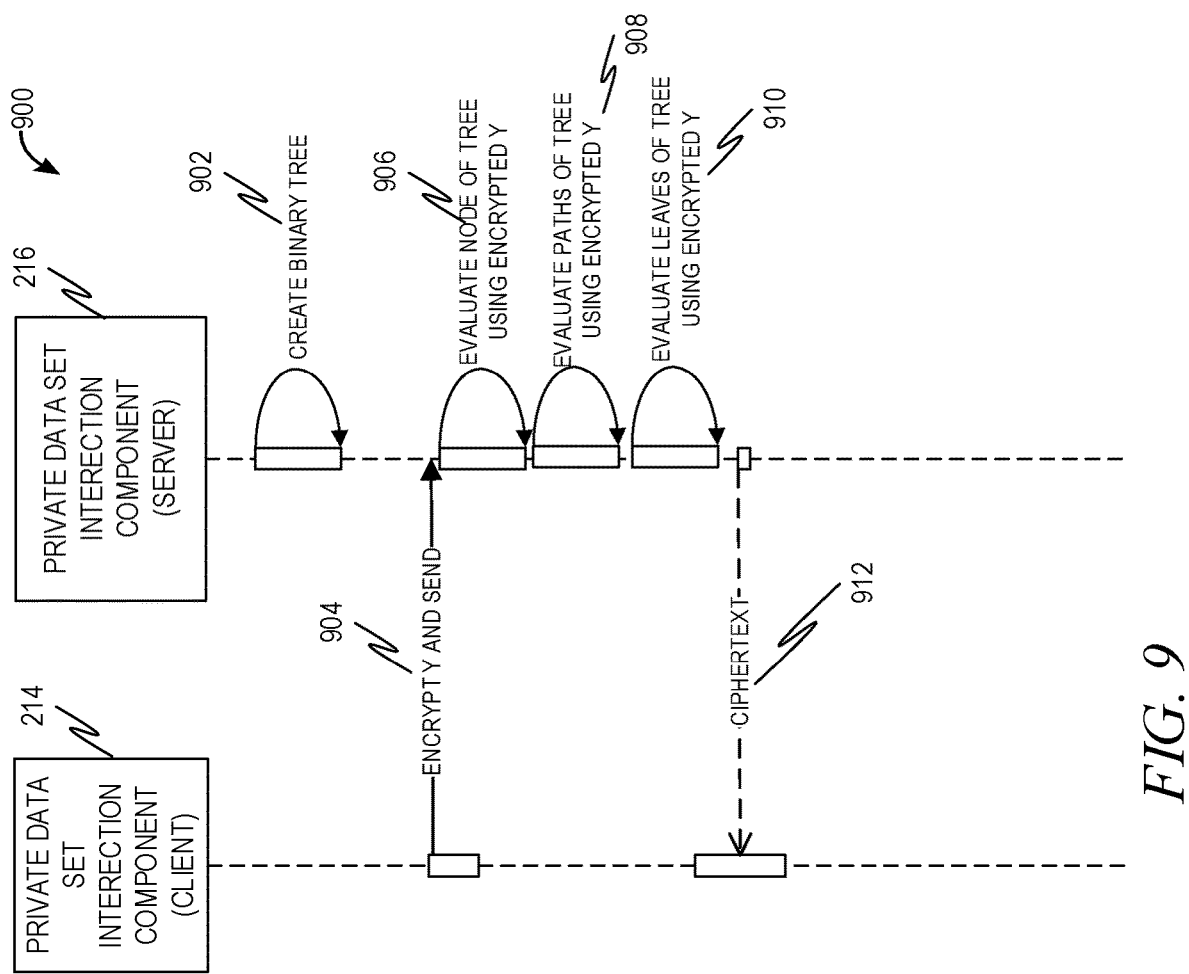
FIG. 9 is a sequence diagram illustrating a procedure for intersecting private data sets, in accordance with an example embodiment.

FIG. 9 is a sequence diagram illustrating a procedure 900 for intersecting private data sets, in accordance with an example embodiment. Here, the procedure 900 utilizes private data set intersection component 214 of client device 202 and private data set intersection component 216 of server device 204. Private data set intersection component 214 obtains input Y and private data set intersection component 216 obtains input X At operation 902, private data set intersection component 216 creates a binary tree. A loop is then begun on private data set intersection component 214, such that for each piece of data y in Y, at operation 904, y is encrypted and sent to private data set intersection component 216. Then, at operation 906 private data set intersection component 216 evaluates nodes of the tree using encrypted y. At operation 908, private data set intersection component 216 evaluates paths of the tree. At operation 910, private data set intersection component 216 evaluates leaves of the tree, producing ciphertext. At operation 912, the ciphertext is sent to private data set intersection component 214.

It should be noted that the computation at the server side can be parallelized. The server divides its set into multiple disjoint subsets, performs the computation for each subset in parallel, and finally aggregates the results. This will be described in more detail below. The server's computation can also be extended to larger functionalities without requiring the help of a client, as will also be described in more detail below.

The communication costs may be further reduced using pre-computation. For each element in its set, the client sends a random ciphertext $[-r_i]$ in the offline phase. In the online phase, the client can send $x_i+r_i$ which is not an FHE ciphertext and thus much more efficient. "+" stands for the group operation of the underlying group, e.g. ⊕ for binary representation. The security is still guaranteed based on the one-time pad. Then, the server can compute $[x_i+r_i] ⊞ [-r_i]$ to obtain the actual input.

Many commonly used FHE schemes are defined over a number field over the cyclotomic polynomial. The plaintext space can be chosen such that the cyclotomic polynomial splits into factors of the same degree. Using the Chinese remainder theorem, this yields an isomorphism between the plaintext space and the factors above, the so-called slots. The isomorphism can be used to encode multiple inputs into each of these slots and encrypt it accordingly. Slot-wise operations may be further applied on the ciphertexts and a SIMD technique may be obtained.

A straightforward optimization is to encode multiple clients' inputs into one ciphertext and evaluate the protocol once. This reduces the computation as well as the communication overhead depending on the slot size. For a slot size of k, the overhead is reduced by factor $$\frac{|Y|}{\lceil |Y|/k \rceil} \approx k.$$

The approach may be generalized using a branching program by relying on an m-ary tree instead of a binary tree. Now, the elements of the sets are parsed by base m and a tree with m children for each inner node is created. The client encrypts values from $\{0, \ldots, m-1\}$, which reduces the number of ciphertexts being sent. Moreover, the computation time on the server can be reduced as well since the server can parallelize the execution of independent subtrees. The only difference in the evaluation of an m-ary tree is the node evaluation since one should take m branches into account. Two possibilities are provided to evaluate the nodes of an m-ary tree.

The first is precomputed Booleans. In order to get the correct input bit, the client could precompute it on plaintext. Instead of an encrypted input digit $[y_i]$, the client sends the encrypted bits $[y_i==0], \ldots, [y_i==(m-1)]$. For node i and branch j the server can take the j-th encrypted Boolean as the decision bit on that branch. This procedure of course neglects the advantage of sending fewer ciphertexts. However, compared to the binary tree and the extension described earlier, the amount of data being sent does not increase significantly.

The second is polynomial evaluation. It is possible to evaluate a polynomial on the server's side to get the decision bit of a branch. For the i-th node and the j-th branch one can homomorphically evaluate the following polynomial at $[y_i]$:

$$P_j([y]) = \frac{\prod_{k=0,k\neq j}^{m-1}([y]-k)}{c_j},$$

for a constant $c_j$. If $y_i$ is any value but j, the product is an encryption of 0. One may choose $c_j$ such that one obtains an encryption of 1 in the other case:

$$c_j = \prod_{k=0,k\neq j}^{m-1}(j-k).$$

Figure 10:
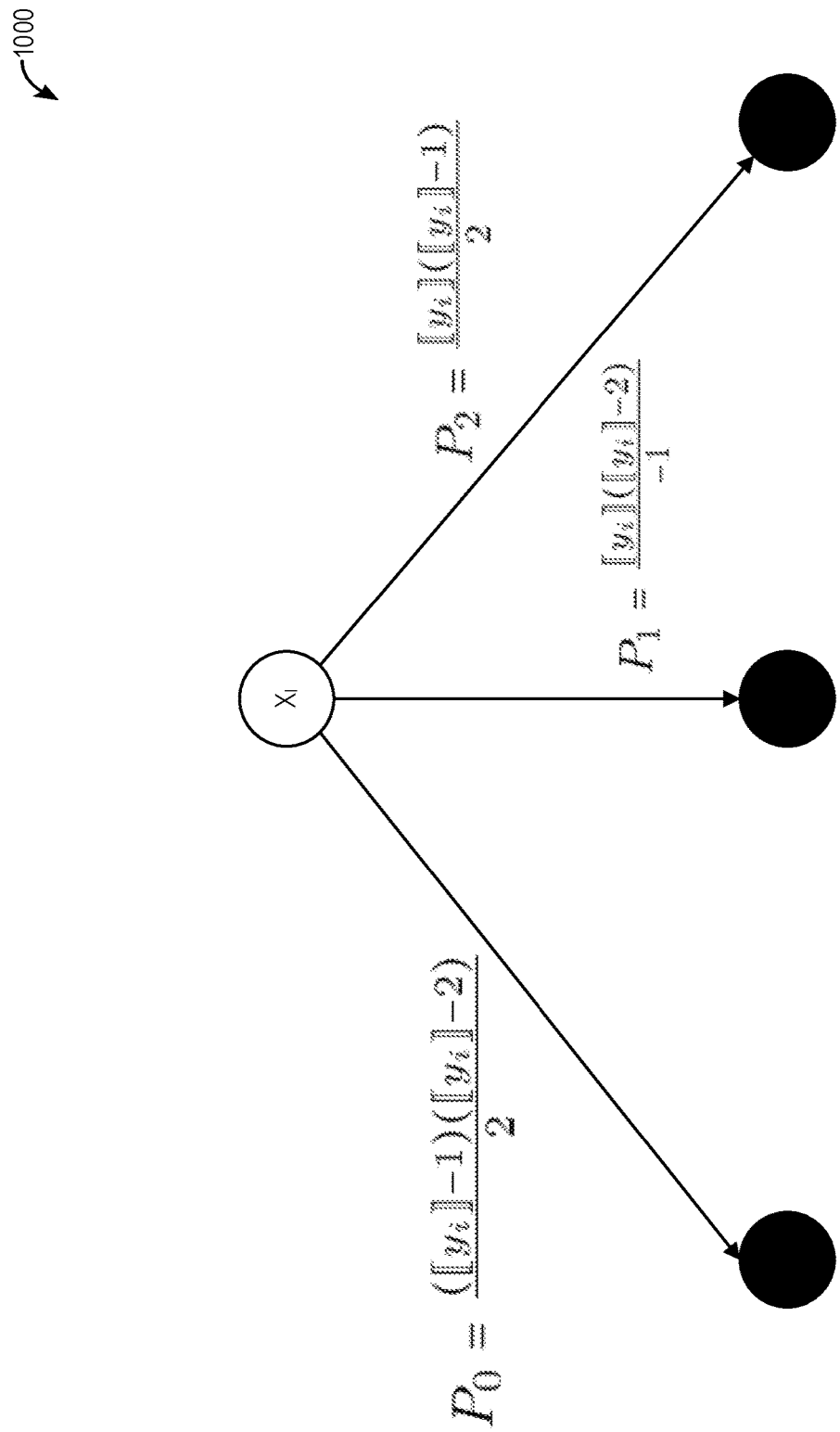
FIG. 10 is a diagram illustrating an example of polynomial evaluation, in accordance with an example embodiment.

FIG. 10 is a diagram illustrating an example of polynomial evaluation 1000, in accordance with an example embodiment.

This procedure increases the multiplicative depth of a decision bit but it is not worse than the basic case since one reduces the tree depth at the same time by using m-ary trees instead of binary trees.

To improve the computational overhead, one can apply a partition on the server's set to allow for parallelization. The server can partition its set $X=\cup_{i=1}^n X_i$ with $X_i \cap X_j=\emptyset$ for $i \neq j$. This obtains $$Y \cap X = Y \cap \left(\bigcup_i X_i\right) = \bigcup_i (Y \cap X_i).$$

Thus, one can apply an intersection procedure on each subset and aggregate the result. Note that one gets a Boolean result for every $y \in Y$ indicating if y is in X. Since the subsets $X_i$ are disjoint, y can be in at most one subset and one can add up the results to obtain the overall result.

Figure 11:
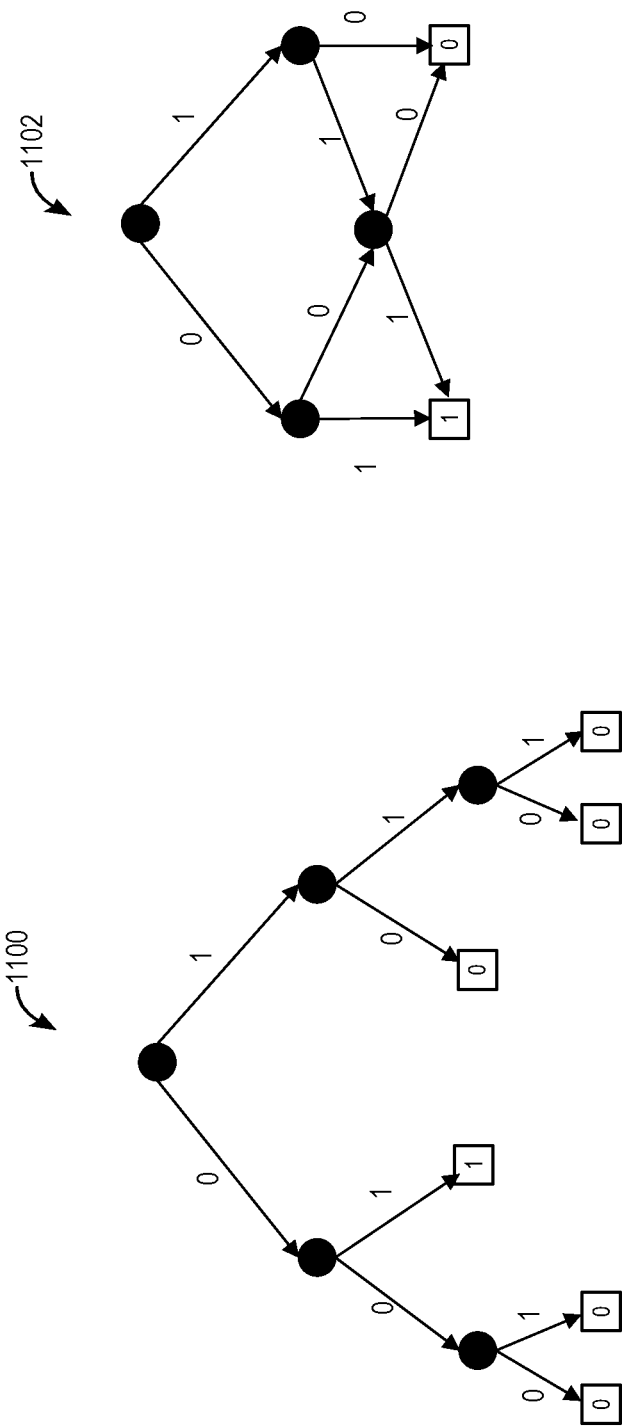
FIG. 11 is an example of a visualization of a pruned tree, in accordance with an example embodiment.

The protocol is based on the evaluation of a BP. So far, the BP has been represented by a tree structure, but there are more efficient ways of evaluating, e.g., a binary decision diagram (BDD). This is a special case of a BP which applies to the present construction. Slight modifications to the evaluation procedure are made since now there are nodes with in-degree greater than 1. FIG. 11 is an example of a visualization of a pruned tree 1100, in accordance with an example embodiment, with an example with X={1, 2, 3, 7} 1100. It is easy to see that the BDD 1102 comprises fewer edges and fewer nodes with leads to a smaller evaluation effort. Evaluating the pruned tree 1100, one needs at least 10 multiplications and 5 additions (aggregating bottom up or using path prefixes). For the BDD 1102, one only needs 8 multiplications and 4 additions.

In the following, changes are presented in the protocol's subroutines. The functions for node evaluation and leaf evaluation can be used without any changes for BDDs.

As to creating the BDD, it would be beneficial to represent the data structure as compact as possible. One possibility is reduced BDDs. A BDD is reduced if none of the reduction rules can be applied. The reduction rules are:

1. Eliminate nodes with isomorphic children
2. Merge isomorphic subgraphs

The first rule corresponds to pruning the tree. The subgraphs are isomorphic since in the data structure, nodes on the same level are labeled with the same input.

For a general approach, one starts with the tree (already a BDD) from the basic protocols and uses algorithms to efficiently reduce it. As an addition of the data structure, the parent attribute is now a list of pointer values since a node can have several parents. Note that this computation can be done in the offline phase and on plaintexts.

Aggregating decision bits along each path works similarly, but care is taken with nodes with more than one predecessor. Instead of evaluating the decision bits of edges to a node's children, one evaluates the decision bits of edges to a node's parents and aggregates them. This is described in the following pseudocode:

```
1:   function EVALPATHS(root)
2:      let Q be a queue
3:      let leaves be a queue
4:      Q.enqueue(root)
5:      while Q.empty( ) = false do
6:         v ← Q.dequeue( )
7:         [tmp] ← [0]
8:         for all p ∈ v.parent do
9:            [tmp] ← [tmp] ⊞ [v.cost] ⊡ [p.cost]
10:        [v.cost] ← [tmp]
11:        if v.isLeaf( ) then
12:           leaves.enqueue(v)
13:        else
14:           if v.left ≠ null then
15:              Q.enqueue(v.left)
16:           if v.right ≠ null then
17:              Q.enqueue(v.right)
18:     return leaves
```

Hashing may also be used. By using hashing schemes, one can improve the computation time significantly. Instead of comparing each element of Y with each element of X, the values are hashed to multiple bins and only elements in the same bin are compared. Examples include simple hashing and Cuckoo hashing or its variants. Another possibility is permutation-based hashing, which enables reducing the length of items mapped to bins while ensuring that no collisions occur. It can also be combined with Cuckoo hashing.

In contrast to simple hashing, Cuckoo hashing uses multiple hash functions to bound the bin size and avoid hashing failures at the same time. Given h hash function $H_1, \ldots, H_h$, the table is built in the following way. Elements are inserted into bins one after another. For an element, the first hash function is applied and the element is replaced by the new one and instead hashed to another bin using the second hash function. This procedure is repeated with all the hash functions until an empty slot has been found. Basic Cuckoo hashing uses two hash functions.

Depending on the parameters and input, there might occur a cycle replacing an element that was already inserted in the same iteration. Therefore, the parameters can be chosen such that this happens with a negligible probability. However, since this can lead to inefficient protocols, one can apply a constant-size stash to decrease the failure probability. If there would occur a cycle, the element is just put in the stash.

The basic idea of optimizing the protocol via hashing is described as follows. The client builds a hash table with $\beta$ bins of at most one element using Cuckoo hashing with h hash functions. The number of bins should be sufficient such that there does not occur a hashing failure with non-negligible probability. The introduction of a constant-size stash can reduce the failure probability. The server hashes its elements into $\beta$ bins using simple hashing and all h hash functions. All the hash functions should be applied since the server does not know which hash function was used to hash a client's element into a specific bin. Note that the bin size of the server will be much larger than one.

Using this construction, one can correctly compute the intersection by computing the intersection of each bin. That is because the server used both hash functions and if an element of the client is hashed to bin Bi, the same element is also hashed to the same bin if it occurs in the server's set. However, the client can pad all the empty bins with a dummy element to prevent any leakage. If one uses a stash, all elements of the stash have to be compared to all the server's elements.

With packing the client's and server's elements, the idea is to apply the SIMD technique described earlier on all the bins. The client's side is straightforward since the client's bin size can be bounded at one and can therefore pack each element into one slot. Hence, one can evaluate multiple inputs on one tree but one needs to evaluate multiple inputs on multiple trees since there are different elements in the server's bins. One can pack the server's elements as well but with slight modifications. Note that the main evaluation of the protocol is generic, i.e. independent of the actual underlying elements to be intersected. In fact, one can evaluate the branching program except the leaf evaluation for all the inputs and apply the leaf aggregation using packed elements. In more detail, multiple leaf node labels are encoded into one Node.cLabel, and the path evaluation function may be performed using a SIMD multiplication. That allows the application of multiple inputs on multiple programs and hence the intersection on each bin with only one program evaluation.

As in the case of packed inputs, there may be an additional restriction. The number of elements per bin may not exceed the number of slots of a ciphertext. This can be a problem for larger server sets. It can be avoided by choosing a larger number of bins and computing on batches in the size of ciphertext slots but that solution requires further evaluation procedures. In the following, a more efficient variant is described. One can batch the server's elements such that each batch fits into the encoding of one ciphertext. The evaluation of the tree can then be done once; the leaf evaluation is done for every batch separately. The results of the batches are aggregated using an XOR operation. One can slightly change the data representation and let cLabel be a vector such that every entry encodes as many elements as there are available slots. The changes of the path evaluation function are presented in a modified variant below:

| | |
|---|---|
| 1: | function EVALLEAVE(leaves) |
| 2: | [b] ← [0] |
| 3: | for each v ∈ leaves do |
| 4: | for each label ∈ v.cLabel do |
| 5: | [b] ← [b] ⊞ ([v.cost] ⊡ [label]) |
| 6: | return [b] |

Since the batching builds a partition of the bin's elements, the result is still correct. A drawback of the hashing procedure is that one cannot use some of the optimization techniques, e.g., pruning and BDD reduction, since they result in different structures for different elements of the server.

The protocol can be applied to any data representation such as phone numbers, passwords or arbitrary files. Hashing the input element solves the problem of different data representations since one can intersect the sets of hashes. Using standard hashing schemes, outputs of 128 or 256 bit are obtained, which would lead to very inefficient protocols. However, one can truncate the hash values to a bit since what is important is matching values, and the probability of a collision is still negligible for a smaller domain. For the probability of a collision to be smaller than $2^{-40}$, the bit-length should fulfill $40+\log|A|+\log|Y| \leq \sigma$. Note that the smaller hashing domain does not have any security implications since encrypted hash values are compared. Instead of sets X and Y, hashed sets $\bar{X}$ and $\bar{Y}$ are compared.

The evaluation of 6-bit values and hence the evaluation of a tree of depth a might still result in an inefficient solution. To improve the solution, one can use permutation-based hashing (PBH). PBH reduces the bit-length of elements that are stored in the bins. This improvement suits the protocol very well since the comparison overhead mainly depends on the bit-length and the tree depth respectively.

Let $f: \mathbb{Z}_{2^{\sigma-\log \beta}} \leftarrow \mathbb{Z}_\beta$ be a random function. PBH uses a Feistel-like structure and divides an element x to be hashed into left and right parts: $x=x_L|x_R$, with $|x_L|=\log \beta$ and therefore $|x_R|=\mu-\log \beta$. Element x is then mapped to bin $x_L \oplus f(x_R)$ and $X_R$ is stored in that bin. This results in $\beta$ different bins and elements of each bin are uniquely identifiable.

Let k be the number of slots for plaintext encoding and $\beta$ the number of bins required for the Cuckoo hashing (depends on |Y|). The complete procedure is applied $$\left\lceil \frac{\beta}{k} \right\rceil$$

times.

Each procedure comprises a SIMD branching program evaluation of depth $\sigma-\log \beta$ with a multiplicative depth of $\log(\sigma-\log \beta)$. Since $\sigma \in \mathcal{O}(\log|X|)$, a depth $D \in \mathcal{F}(\log \log|X|)$ is obtained. That is a very weak dependence on the server's set size, which is negligible in practical applications since real-world scenarios do not differ that much in a log-log magnitude. If multiplicative depth is not of relevance for the underlying scheme, the dependence completely vanishes.

The basic version of the protocol computes the intersection between the client's set Y and the server's set X. More specifically, the server computes an encrypted bit $[b_y]$ which tells if $y \in Y$ is also in X. This output makes it possible to do any further computations on the intersection. Some examples are PSI-CAT and PSI-Sum.

In PSI-CAT (or Threshold-PSI), the goal is to reveal the intersection or the intersection size only if it exceeds a specific threshold. In a first step, the size of the intersection is computed:

$$S = \sum_{i=1}^{|Y|} [b_{y_i}].$$

For a threshold t, one can then homomorphically compute $$[b_{CAT}] = [S \geq t].$$

In PSI-Sum, the goal is to sum up payloads associated with each input for all the inputs of the intersection. Let $p_i$ be the payload corresponding to element $y_i$. Then, one obtains the result $$[b_{sum}] = \sum_{i=1}^{|Y|} [b_{y_i}][\cdot][p_i].$$

In this way, the client can keep even the payloads secret.

Such extensions are possible because one can address each element of the intersection since a homomorphic multiplication of the Boolean output and the element gives us the element if it is in the intersection or 0 otherwise. Thus, all the extended computation can be done by the server as well. Note that only circuit-based protocols allow for such simple and straightforward extensions of functionalities. Other methods might need a reconstruction of the protocol itself to guarantee security and allow for the functionalities.

Homomorphic multiplication involves a mechanism to multiply two homomorphic encryptions x1=Enc(m1) and c2=Enc(m2) in a way that produces Enc(m1*m2). The concrete implementation of the homomorphic multiplication itself depends on the encryption scheme. A simple example using Rivest-Shamir-Adleman (RSA) encryption is as follows: Enc(m1)=m1^e (m1 raised to the power of e) and Enc(m2)=m2^e. For RSA, the homomorphic multiplication can be computed by multiplying the ciphertexts, hence Enc(m1)*Enc(m2)=m1^e*m2^e=(m1*m2)^e=Enc(m1*m2).

As described earlier, the protocol is built for a client-server scenario in which the server holds the larger set and has a lot of computational power. In case there is not enough computational power, the server might outsource the computational effort to a third party. With some slight modifications, the protocol can be extended such that the server can outsource the main computation to a third party in a secure manner. As the client, the server encrypts its program, and the third party can evaluate the protocol on encrypted inputs Y and an encrypted tree built on X. To this end, the server builds the tree and encrypts edge labels and leaf node labels. Since it is desirable to guarantee the server's privacy, the tree should be created in a generic way such that the resulting structure does not leak anything about the server's set. The server sends these encrypted values and the client sends the encrypted elements to the third party, which applies the same evaluation as before except an encrypted node evaluation function. In contrast to the plaintext case, the evaluation is done homomorphically. The modification can be found in the pseudocode below, where lines 8 and 11 have changed compared to the basic protocol:

```
1:  function EVALNODES(root, [ȳ])
2:     let Q be a new queue
3:     Q.enqueue(root)
4:     parse [ȳ] to [y[1]], . . . , [y[μ]]
5:     while Q.empty( ) = false do
6:        v ← Q.dequeue( )
7:        if v.left ≠ null then
8:           [v.left.cost] ← [y[v.level]] ⊞ [v.lEdge]    ▶Encrypted label
9:           Q. enqueue(v.left)
10:       if v.right ≠ null then
11:          [v.right.cost] ← [y[v.level]] ⊞ [v.rEdge]   ▶Encrypted label
12:          Q. enqueue(v.right)
```

Figure 12:
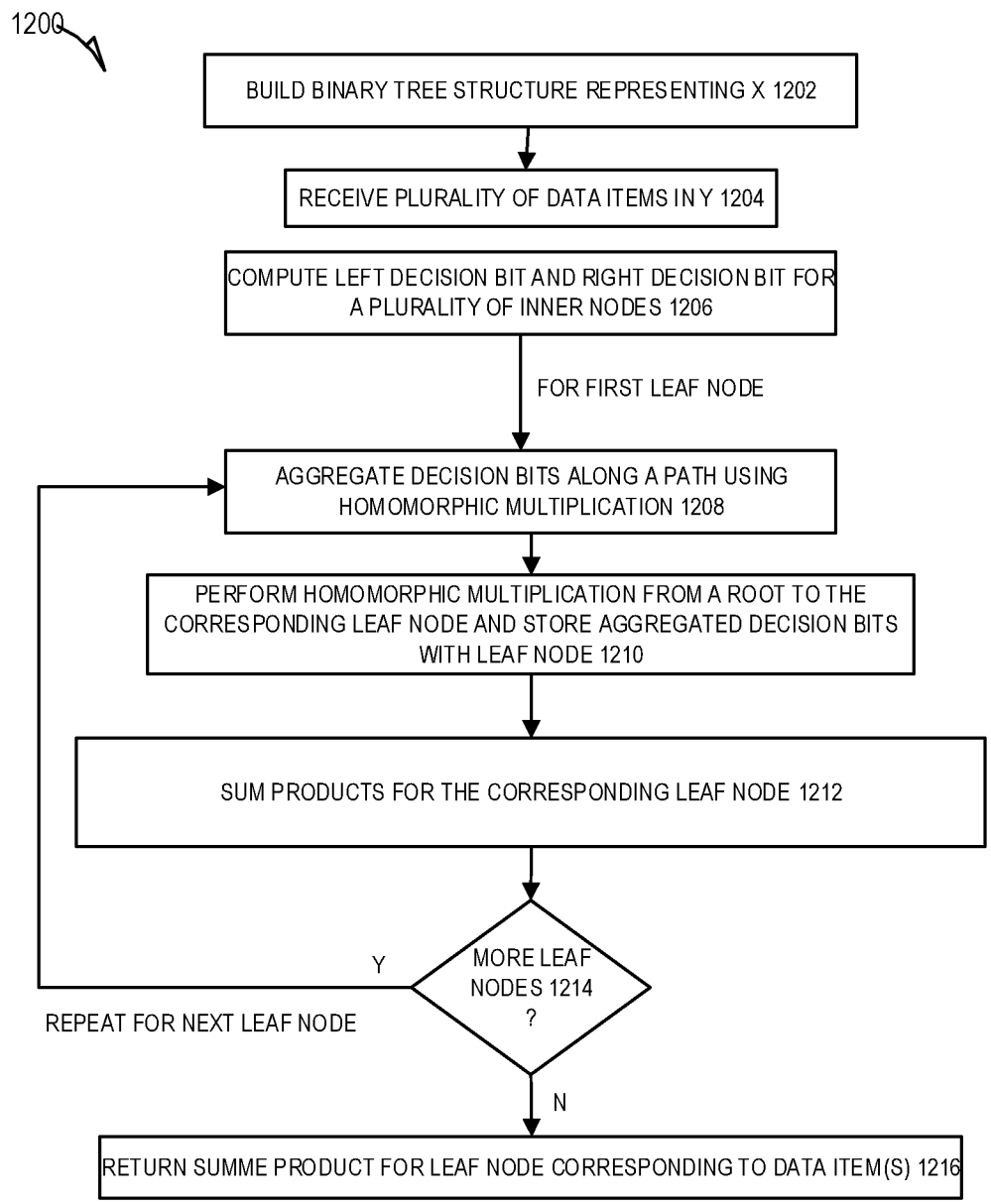
FIG. 12 is a flow diagram illustrating a method for intersecting a private data set X of a server computing device and a private data set Y of a client computing device, in accordance with an example embodiment.

FIG. 12 is a flow diagram illustrating a method 1200 for intersecting a private data set X of a server computing device and a private data set Y of a client computing device, in accordance with an example embodiment. At operation 1202, a binary tree data structure representing X is built. The binary tree data structure represents a plurality of bit strings, each inner node in the binary tree data structure containing a left edge label for a left child node and a right edge label for a right child node. At operation 1204, a plurality of data items in Y are received from the client computing device, all of the data items having been bitwise encrypted into corresponding ciphertexts using a homomorphic encryption scheme.

At operation 1206, a left decision bit and a right decision bit are computed for a plurality of inner nodes in the binary tree data structure, by comparing each of the ciphertexts to the left edge label and the right edge label for each of the plurality of inner nodes in the binary tree data structure. A loop is then begun for each leaf node in the binary tree data structure. At operation 1208, the decision bits along a path are aggregated, using homomorphic multiplication, from a root to the corresponding leaf node of the binary tree data structure, and the aggregated decision bits are stored with the corresponding leaf node. At operation 1210, a homomorphic multiplication of the aggregated decision bits is performed for the corresponding leaf node and the node label for the corresponding leaf node, producing a product for the corresponding leaf node. At operation 1212, the products for the corresponding leaf node are summed. At operation 1214, it is determined if there are any more leaf nodes. If so, the method 1200 loops back to operation 1208 for the next leaf node.

If not, then at operation 1216, for at least one data item in Y, the summed product for a leaf node corresponding to the data item is returned as an indication of whether the data item is contained in X.

In view of the above-described implementations of subject matter, this application discloses the following list of examples, wherein one feature of an example in isolation or more than one feature of said example taken in combination and, optionally, in combination with one or more features of one or more further examples are further examples also falling within the disclosure of this application:

Example 1. A system comprising:
at least one hardware processor; and
a non-transitory computer-readable medium storing instructions that, when executed by the at least one hardware processor, perform operations for intersecting a private data set X of a server computing device and a private data set Y of a client computing device, the operations comprising:

building a binary tree data structure representing the first private data set, the binary tree data structure representing a plurality of bit strings, each inner node in the binary tree data structure containing a left edge label for a left child node and a right edge label for a right child node;

receiving, from the client computing device, a plurality of data items in the second private data set, at least one of the data items having been bitwise encrypted into corresponding ciphertexts using a homomorphic encryption scheme;

computing a left decision bit and a right decision bit for a plurality of inner nodes in the binary tree data structure by comparing each of the ciphertexts to the left edge label and the right edge label for each of the plurality of inner nodes in the binary tree data structure;

for each leaf node in the binary tree data structure, aggregating the decision bits along a path, using homomorphic multiplication, from a root to the corresponding leaf node of the binary tree data structure and storing the aggregated decision bits with the corresponding leaf node, and performing a homomorphic multiplication of the aggregated decision bits for the corresponding leaf node and the node label for the corresponding leaf node, producing a product for the corresponding leaf node;

summing the products for the corresponding leaf node; and for at least one data item in the second private data set, returning the summed product for a leaf node corresponding to the data item as an indication of whether the data item is contained in the first private data set.

Example 2. The system of Example 1, wherein each leaf node in the binary tree data structure has a positive node label if a corresponding bit string is contained in the first private data set and a negative node label if the corresponding bit string is not contained in the first private data set.

Example 3. The system of Examples 1 or 2, wherein the client computing device generates a public key, a private key, and an evaluation key for the homomorphic encryption scheme and sends the public key and the evaluation key to the server computing device.

Example 4. The system of any of Examples 1-3, wherein the building the binary tree data structure includes inserting each data item in the first private data set into the binary tree data structure as a leaf node by traversing the binary tree data structure according to each node's left child label and right child label, and collecting the leaf nodes in a leaves queue.

Example 5. The system of Example 4, wherein the building the binary tree data structure further comprises pruning the binary tree data structure by successfully removing a first two elements in the leaves queue and, if they an identical parent and node label, transforming their parent into a lead node with the same label and adding that transformed parent to an end of the leaves queue.

Example 6. The system of Examples 4 or 5, wherein the traversing includes marking any untraversed subtrees in the binary tree data structure with a negative label.

Example 7. The system of any of Examples 1-6, wherein the operations are performed on the server computing device.

Example 8. A method comprising:

building a binary tree data structure representing the first private data set, the binary tree data structure representing a plurality of bit strings, each inner node in the binary tree data structure containing a left edge label for a left child node and a right edge label for a right child node;

receiving, from the client computing device, a plurality of data items in the second private data set, at least one of the data items having been bitwise encrypted into corresponding ciphertexts using a homomorphic encryption scheme;

computing a left decision bit and a right decision bit for a plurality of inner nodes in the binary tree data structure by comparing each of the ciphertexts to the left edge label and the right edge label for each of the plurality of inner nodes in the binary tree data structure;

for each leaf node in the binary tree data structure, aggregating the decision bits along a path, using homomorphic multiplication, from a root to the corresponding leaf node of the binary tree data structure and storing the aggregated decision bits with the corresponding leaf node, and performing a homomorphic multiplication of the aggregated decision bits for the corresponding leaf node and the node label for the corresponding leaf node, producing a product for the corresponding leaf node;

summing the products for the corresponding leaf node; and for at least one data item in the second private data set, returning the summed product for a leaf node corresponding to the data item as an indication of whether the data item is contained in the first private data set.

Example 9. The method of Example 8, wherein each leaf node in the binary tree data structure has a positive node label if a corresponding bit string is contained in the first private data set and a negative node label if the corresponding bit string is not contained in the first private data set.

Example 10. The method of Examples 8 or 9, wherein the client computing device generates a public key, a private key, and an evaluation key for the homomorphic encryption scheme and sends the public key and the evaluation key to a server computing device.

Example 11. The method of any of Examples 8-10, wherein the building the binary tree data structure includes inserting each data item in the first private data set into the binary tree data structure as a leaf node by traversing the binary tree data structure according to each node's left child label and right child label, and collecting the leaf nodes in a leaves queue.

Example 12. The method of Example 11, wherein the building the binary tree data structure further comprises pruning the binary tree data structure by successfully removing a first two elements in the leaves queue and, if they have an identical parent and node label, transforming their parent into a lead node with the same label and adding that transformed parent to an end of the leaves queue.

Example 13. The method of Examples 11 or 12, wherein the traversing includes marking any untraversed subtrees in the binary tree data structure with a negative label.

Example 14. The method of any of Examples 8-13, wherein the operations are performed on the server computing device.

Example 15. A non-transitory machine-readable medium storing instructions which, when executed by one or more processors, cause the one or more processors to perform operations comprising:
building a binary tree data structure representing the first private data set, the binary tree data structure representing a plurality of bit strings, each inner node in the binary tree data structure containing a left edge label for a left child node and a right edge label for a right child node;
receiving, from the client computing device, a plurality of data items in the second private data set, at least one of the data items having been bitwise encrypted into corresponding ciphertexts using a homomorphic encryption scheme;
computing a left decision bit and a right decision bit for a plurality of inner nodes in the binary tree data structure by comparing each of the ciphertexts to the left edge label and the right edge label for each of the plurality of inner nodes in the binary tree data structure;
for each leaf node in the binary tree data structure, aggregating the decision bits along a path, using homomorphic multiplication, from a root to the corresponding leaf node of the binary tree data structure and storing the aggregated decision bits with the corresponding leaf node, and performing a homomorphic multiplication of the aggregated decision bits for the corresponding leaf node and the node label for the corresponding leaf node, producing a product for the corresponding leaf node;
summing the products for the corresponding leaf node; and
for at least one data item in the second private data set, returning the summed product for a leaf node corresponding to the data item as an indication of whether the data item is contained in the first private data set.

Example 16. The non-transitory machine-readable medium of Example 15, wherein each leaf node in the binary tree data structure has a positive node label if a corresponding bit string is contained in the first private data set and a negative node label if the corresponding bit string is not contained in the first private data set.

Example 17. The non-transitory machine-readable medium of Examples 15 or 16, wherein the client computing device generates a public key, a private key, and an evaluation key for the homomorphic encryption scheme and sends the public key and the evaluation key to a server computing device.

Example 18. The non-transitory machine-readable medium of any of Examples 15-17, wherein the building the binary tree data structure includes inserting each data item in the first private data set into the binary tree data structure as a leaf node by traversing the binary tree data structure according to each node's left child label and right child label, and collecting the leaf nodes in a leaves queue.

Example 19. The non-transitory machine-readable medium of Example 18, wherein the building the binary tree data structure further comprises pruning the binary tree data structure by successfully removing a first two elements in the leaves queue and, if they have an identical parent and node label, transforming their parent into a lead node with the same label and adding that transformed parent to an end of the leaves queue.

Example 20. The non-transitory machine-readable medium of Examples 18 or 19, wherein the traversing includes marking any untraversed subtrees in the binary tree data structure with a negative label.

Figure 13:
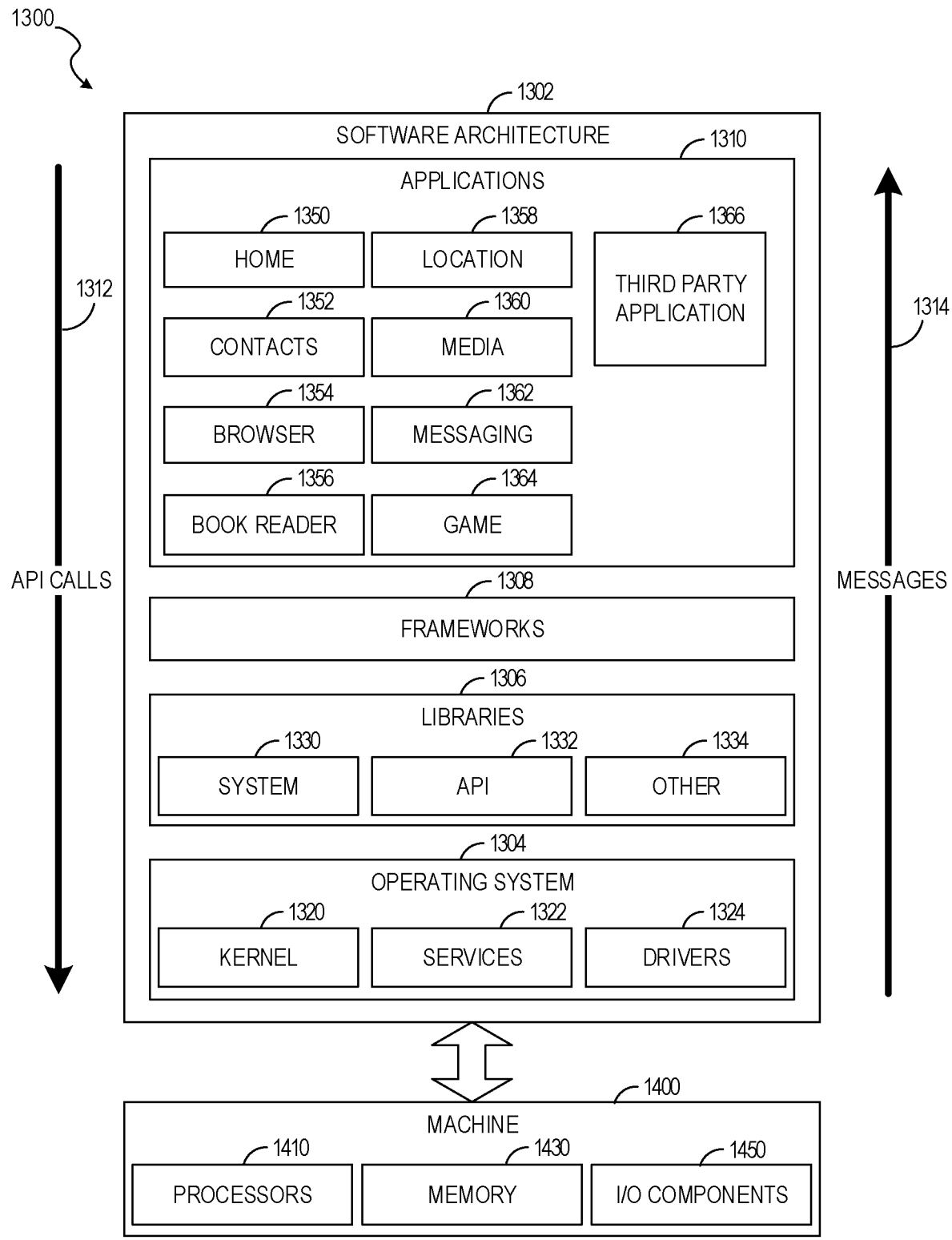
FIG. 13 is a block diagram illustrating an architecture of software, which can be installed on any one or more of the devices described above.

FIG. 13 is a block diagram 1300 illustrating a software architecture 1302, which can be installed on any one or more of the devices described above. FIG. 13 is merely a non-limiting example of a software architecture, and it will be appreciated that many other architectures can be implemented to facilitate the functionality described herein. In various embodiments, the software architecture 1302 is implemented by hardware such as a machine 1400 of FIG. 14 that includes processors 1410, memory 1430, and input/output (I/O) components 1450. In this example architecture, the software architecture 1302 can be conceptualized as a stack of layers where each layer may provide a particular functionality. For example, the software architecture 1302 includes layers such as an operating system 1304, libraries 1306, frameworks 1308, and applications 1310. Operationally, the applications 1310 invoke Application Program Interface (API) calls 1312 through the software stack and receive messages 1314 in response to the API calls 1312, consistent with some embodiments.

In various implementations, the operating system 1304 manages hardware resources and provides common services. The operating system 1304 includes, for example, a kernel 1320, services 1322, and drivers 1324. The kernel 1320 acts as an abstraction layer between the hardware and the other software layers, consistent with some embodiments. For example, the kernel 1320 provides memory management, processor management (e.g., scheduling), component management, networking, and security settings, among other functionality. The services 1322 can provide other common services for the other software layers. The drivers 1324 are responsible for controlling or interfacing with the underlying hardware. For instance, the drivers 1324 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 1306 provide a low-level common infrastructure utilized by the applications 1310. The libraries 1306 can include system libraries 1330 (e.g., C standard library) that can provide functions such as memory allocation functions, string manipulation functions, mathematic functions, and the like. In addition, the libraries 1306 can include API libraries 1332 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two-dimensional (2D) and three-dimensional (3D) in a graphic context on a display), database libraries (e.g., SQLite to provide various relational database functions), web libraries (e.g., WebKit to provide web browsing functionality), and the like. The libraries 1306 can also include a wide variety of other libraries 1334 to provide many other APIs to the applications 1310.

The frameworks 1308 provide a high-level common infrastructure that can be utilized by the applications 1310. For example, the frameworks 1308 provide various graphical user interface functions, high-level resource management, high-level location services, and so forth. The frameworks 1308 can provide a broad spectrum of other APIs that can be utilized by the applications 1310, some of which may be specific to a particular operating system 1304 or platform.

In an example embodiment, the applications 1310 include a home application 1350, a contacts application 1352, a browser application 1354, a book reader application 1356, a location application 1358, a media application 1360, a messaging application 1362, a game application 1364, and a broad assortment of other applications, such as a third-party application 1366. The applications 1310 are programs that execute functions defined in the programs. Various programming languages can be employed to create one or more of the applications 1310, structured in a variety of manners, such as object-oriented programming languages (e.g., Objective-C, Java, or C++) or procedural programming languages (e.g., C or assembly language). In a specific example, the third-party application 1366 (e.g., an application developed using the ANDROID™ or IOS™ software development kit (SDK) by an entity other than the vendor of the particular platform) may be mobile software running on a mobile operating system such as IOS™, ANDROID™ WINDOWS® Phone, or another mobile operating system. In this example, the third-party application 1366 can invoke the API calls 1312 provided by the operating system 1304 to facilitate functionality described herein.

Figure 14:
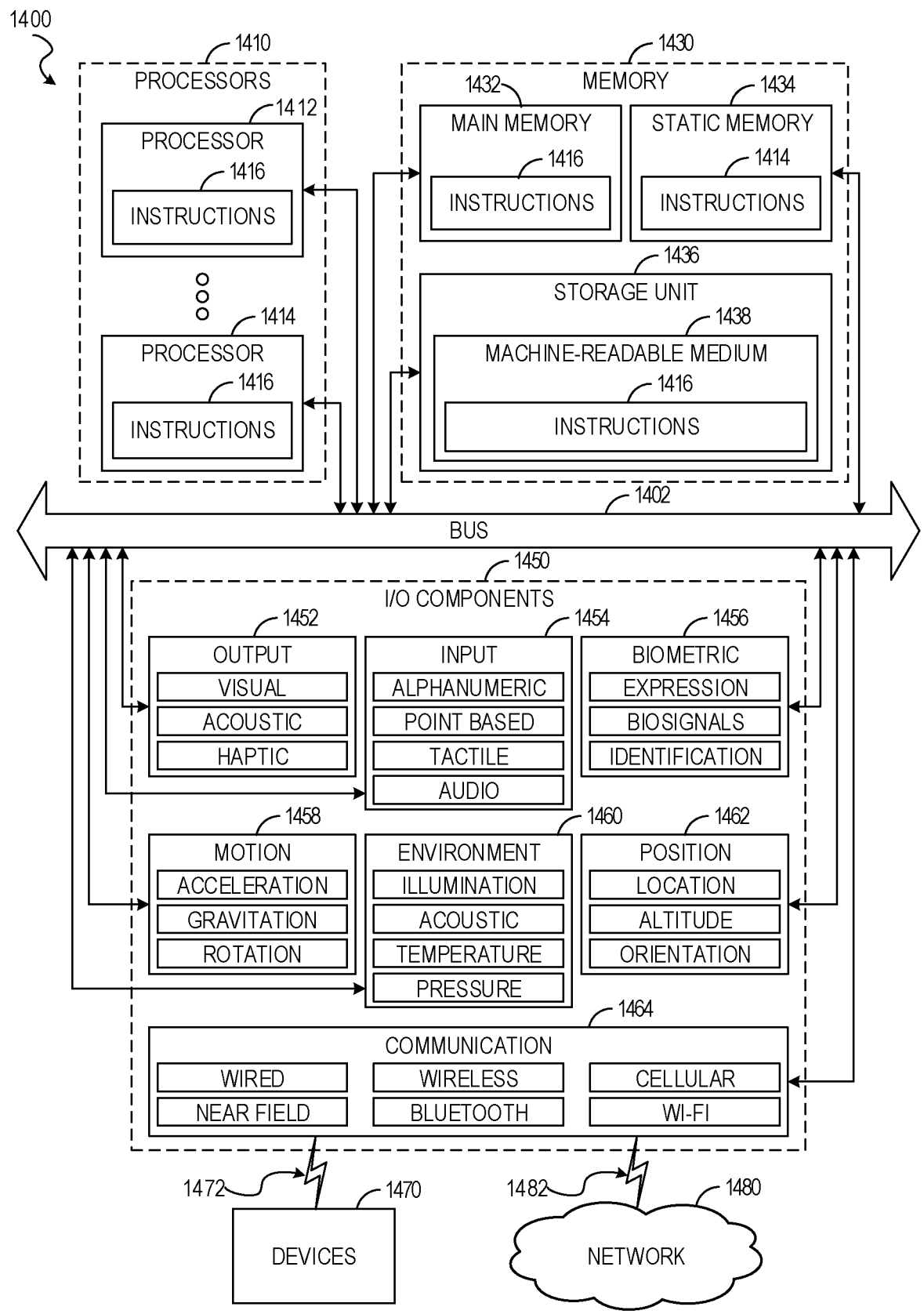
FIG. 14 illustrates a diagrammatic representation of a machine in the form of a computer system within which a set of instructions may be executed for causing the machine to perform any one or more of the methodologies discussed herein, according to an example embodiment.

FIG. 14 illustrates a diagrammatic representation of a machine 1400 in the form of a computer system within which a set of instructions may be executed for causing the machine 1400 to perform any one or more of the methodologies discussed herein. Specifically, FIG. 14 shows a diagrammatic representation of the machine 1400 in the example form of a computer system, within which instructions 1416 (e.g., software, a program, an application, an applet, an app, or other executable code) for causing the machine 1400 to perform any one or more of the methodologies discussed herein may be executed. For example, the instructions 1416 may cause the machine 1400 to execute the method of FIG. 12. Additionally, or alternatively, the instructions 1416 may implement FIGS. 1-12 and so forth. The instructions 1416 transform the general, non-programmed machine 1400 into a particular machine 1400 programmed to carry out the described and illustrated functions in the manner described. In alternative embodiments, the machine 1400 operates as a standalone device or may be coupled (e.g., networked) to other machines. In a networked deployment, the machine 1400 may operate in the capacity of a server machine or a client machine in a server-client network environment, or as a peer machine in a peer-to-peer (or distributed) network environment. The machine 1400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1416, sequentially or otherwise, that specify actions to be taken by the machine 1400. Further, while only a single machine 1400 is illustrated, the term "machine" shall also be taken to include a collection of machines 1400 that individually or jointly execute the instructions 1416 to perform any one or more of the methodologies discussed herein.

The machine 1400 may include processors 1410, memory 1430, and I/O components 1450, which may be configured to communicate with each other such as via a bus 1402. In an example embodiment, the processors 1410 (e.g., a CPU, a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1412 and a processor 1414 that may execute the instructions 1416. The term "processor" is intended to include multi-core processors that may comprise two or more independent processors (sometimes referred to as "cores") that may execute instructions 1416 contemporaneously. Although FIG. 14 shows multiple processors 1410, the machine 1400 may include a single processor 1412 with a single core, a single processor 1412 with multiple cores (e.g., a multi-core processor 1412), multiple processors 1412, 1414 with a single core, multiple processors 1412, 1414 with multiple cores, or any combination thereof.

The memory 1430 may include a main memory 1432, a static memory 1434, and a storage unit 1436, each accessible to the processors 1410 such as via the bus 1402. The main memory 1432, the static memory 1434, and the storage unit 1436 store the instructions 1416 embodying any one or more of the methodologies or functions described herein. The instructions 1416 may also reside, completely or partially, within the main memory 1432, within the static memory 1434, within the storage unit 1436, within at least one of the processors 1410 (e.g., within the processor's cache memory), or any suitable combination thereof, during execution thereof by the machine 1400.

The I/O components 1450 may include a wide variety of components to receive input, provide output, produce output, transmit information, exchange information, capture measurements, and so on. The specific I/O components 1450 that are included in a particular machine will depend on the type of machine. For example, portable machines such as mobile phones will likely include a touch input device or other such input mechanisms, while a headless server machine will likely not include such a touch input device. It will be appreciated that the I/O components 1450 may include many other components that are not shown in FIG. 14. The I/O components 1450 are grouped according to functionality merely for simplifying the following discussion, and the grouping is in no way limiting. In various example embodiments, the I/O components 1450 may include output components 1452 and input components 1454. The output components 1452 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1454 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1450 may include biometric components 1456, motion components 1458, environmental components 1460, or position components 1462, among a wide array of other components. For example, the biometric components 1456 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1458 may include acceleration sensor components (e.g., accelerometer), gravitation sensor components, rotation sensor components (e.g., gyroscope), and so forth. The environmental components 1460 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1462 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1450 may include communication components 1464 operable to couple the machine 1400 to a network 1480 or devices 1470 via a coupling 1482 and a coupling 1472, respectively. For example, the communication components 1464 may include a network interface component or another suitable device to interface with the network 1480. In further examples, the communication components 1464 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1470 may be another machine or any of a wide variety of peripheral devices (e.g., coupled via a USB).

Moreover, the communication components 1464 may detect identifiers or include components operable to detect identifiers. For example, the communication components 1464 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1464, such as location via Internet Protocol (IP) geolocation, location via Wi-Fi® signal triangulation, location via detecting an NFC beacon signal that may indicate a particular location, and so forth.

The various memories (i.e., 1430, 1432, 1434, and/or memory of the processor(s) 1410) and/or the storage unit 1436 may store one or more sets of instructions 1416 and data structures (e.g., software) embodying or utilized by any one or more of the methodologies or functions described herein. These instructions (e.g., the instructions 1416), when executed by the processor(s) 1410, cause various operations to implement the disclosed embodiments.

As used herein, the terms "machine-storage medium," "device-storage medium," and "computer-storage medium" mean the same thing and may be used interchangeably. The terms refer to single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 1480 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1480 or a portion of the network 1480 may include a wireless or cellular network, and the coupling 1482 may be a Code Division Multiple Access (CDMA) connection, a Global System for Mobile communications (GSM) connection, or another type of cellular or wireless coupling. In this example, the coupling 1482 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 5G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 1416 may be transmitted or received over the network 1480 using a transmission medium via a network interface device (e.g., a network interface component included in the communication components 1464) and utilizing any one of a number of well-known transfer protocols (e.g., HTTP). Similarly, the instructions 1416 may be transmitted or received using a transmission medium via the coupling 1472 (e.g., a peer-to-peer coupling) to the devices 1470. The terms "transmission medium" and "signal medium" mean the same thing and may be used interchangeably in this disclosure. The terms "transmission medium"

and "signal medium" shall be taken to include any intangible medium that is capable of storing, encoding, or carrying the instructions 1416 for execution by the machine 1400, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
    at least one hardware processor; and
    a non-transitory computer-readable medium storing instructions that, when executed by the at least one hardware processor, perform operations for intersecting a first private data set of a server computing device and a second private data set of a client computing device, the operations comprising:
    building a binary tree data structure representing the first private data set, the binary tree data structure representing a plurality of bit strings, each inner node in the binary tree data structure containing a left edge label for a left child node and a right edge label for a right child node;
    receiving, from the client computing device, a plurality of data items in the second private data set, at least one of the data items having been bitwise encrypted into corresponding ciphertexts using a homomorphic encryption scheme;
    computing a left decision bit and a right decision bit for a plurality of inner nodes in the binary tree data structure by comparing each of the ciphertexts to the left edge label and the right edge label for each of the plurality of inner nodes in the binary tree data structure;
    for each leaf node in the binary tree data structure, aggregating the decision bits along a path, using homomorphic multiplication, from a root to the corresponding leaf node of the binary tree data structure and storing the aggregated decision bits with the corresponding leaf node, and performing a homomorphic multiplication of the aggregated decision bits for the corresponding leaf node and the node label for the corresponding leaf node, producing a product for the corresponding leaf node;
    summing the products for the corresponding leaf node; and
    for at least one data item in the second private data set, returning the summed product for a leaf node corresponding to the data item as an indication of whether the data item is contained in the first private data set.

2. The system of claim 1, wherein each leaf node in the binary tree data structure has a positive node label if a corresponding bit string is contained in the first private data set and a negative node label if the corresponding bit string is not contained in the first private data set.

3. The system of claim 1, wherein the client computing device generates a public key, a private key, and an evaluation key for the homomorphic encryption scheme and sends the public key and the evaluation key to the server computing device.

4. The system of claim 1, wherein the building the binary tree data structure includes inserting each data item in the first private data set into the binary tree data structure as a leaf node by traversing the binary tree data structure according to each node's left child label and right child label, and collecting the leaf nodes in a leaves queue.

5. The system of claim 4, wherein the building the binary tree data structure further comprises pruning the binary tree data structure by successfully removing a first two elements in the leaves queue and, if they have an identical parent and node label, transforming their parent into a lead node with a same label and adding that transformed parent to an end of the leaves queue.

6. The system of claim 4, wherein the traversing includes marking any untraversed subtrees in the binary tree data structure with a negative label.

7. The system of claim 1, wherein the operations are performed on the server computing device.

8. A method for intersecting a first private data set of a server computing device and a second private data set of a client computing device, comprising:
    building a binary tree data structure representing the first private data set, the binary tree data structure representing a plurality of bit strings, each inner node in the binary tree data structure containing a left edge label for a left child node and a right edge label for a right child node;
    receiving, from the client computing device, a plurality of data items in the second private data set, at least one of the data items having been bitwise encrypted into corresponding ciphertexts using a homomorphic encryption scheme;
    computing a left decision bit and a right decision bit for a plurality of inner nodes in the binary tree data structure by comparing each of the ciphertexts to the left edge label and the right edge label for each of the plurality of inner nodes in the binary tree data structure;
    for each leaf node in the binary tree data structure, aggregating the decision bits along a path, using homomorphic multiplication, from a root to the corresponding leaf node of the binary tree data structure and storing the aggregated decision bits with the corresponding leaf node, and performing a homomorphic multiplication of the aggregated decision bits for the corresponding leaf node and the node label for the corresponding leaf node, producing a product for the corresponding leaf node;
    summing the products for the corresponding leaf node; and
    for at least one data item in the second private data set, returning the summed product for a leaf node corresponding to the data item as an indication of whether the data item is contained in the first private data set.

9. The method of claim 8, wherein each leaf node in the binary tree data structure has a positive node label if a corresponding bit string is contained in the first private data set and a negative node label if the corresponding bit string is not contained in the first private data set.

10. The method of claim 8, wherein the client computing device generates a public key, a private key, and an evaluation key for the homomorphic encryption scheme and sends the public key and the evaluation key to a server computing device.

11. The method of claim 8, wherein the building the binary tree data structure includes inserting each data item in the first private data set into the binary tree data structure as a leaf node by traversing the binary tree data structure according to each node's left child label and right child label, and collecting the leaf nodes in a leaves queue.

12. The method of claim 11, wherein the building the binary tree data structure further comprises pruning the binary tree data structure by successfully removing a first two elements in the leaves queue and, if they have an identical parent and node label, transforming their parent into a lead node with a same label and adding that transformed parent to an end of the leaves queue.

13. The method of claim 11, wherein the traversing includes marking any untraversed subtrees in the binary tree data structure with a negative label.

14. The method of claim 8, wherein the method is performed on a server computing device.

15. A non-transitory machine-readable medium storing instructions which, when executed by one or more processors, cause the one or more processors to perform operations for intersecting a first private data set of a server computing device and a second private data set of a client computing device, comprising:

building a binary tree data structure representing the first private data set, the binary tree data structure representing a plurality of bit strings, each inner node in the binary tree data structure containing a left edge label for a left child node and a right edge label for a right child node;

receiving, from the client computing device, a plurality of data items in the second private data set, at least one of the data items having been bitwise encrypted into corresponding ciphertexts using a homomorphic encryption scheme;

computing a left decision bit and a right decision bit for a plurality of inner nodes in the binary tree data structure by comparing each of the ciphertexts to the left edge label and the right edge label for each of the plurality of inner nodes in the binary tree data structure;

for each leaf node in the binary tree data structure, aggregating the decision bits along a path, using homomorphic multiplication, from a root to the corresponding leaf node of the binary tree data structure and storing the aggregated decision bits with the corresponding leaf node, and performing a homomorphic multiplication of the aggregated decision bits for the corresponding leaf node and the node label for the corresponding leaf node, producing a product for the corresponding leaf node;

summing the products for the corresponding leaf node; and for at least one data item in the second private data set, returning the summed product for a leaf node corresponding to the data item as an indication of whether the data item is contained in the first private data set.

16. The non-transitory machine-readable medium of claim 15, wherein each leaf node in the binary tree data structure has a positive node label if a corresponding bit string is contained in the first private data set and a negative node label if the corresponding bit string is not contained in the first private data set.

17. The non-transitory machine-readable medium of claim 15, wherein the client computing device generates a public key, a private key, and an evaluation key for the homomorphic encryption scheme and sends the public key and the evaluation key to a server computing device.

18. The non-transitory machine-readable medium of claim 15, wherein the building the binary tree data structure includes inserting each data item in the first private data set into the binary tree data structure as a leaf node by traversing the binary tree data structure according to each node's left child label and right child label, and collecting the leaf nodes in a leaves queue.

19. The non-transitory machine-readable medium of claim 18, wherein the building the binary tree data structure further comprises pruning the binary tree data structure by successfully removing a first two elements in the leaves queue and, if they have an identical parent and node label, transforming their parent into a lead node with a same label and adding that transformed parent to an end of the leaves queue.

20. The non-transitory machine-readable medium of claim 18, wherein the traversing includes marking any untraversed subtrees in the binary tree data structure with a negative label.

* * * * *